United States Patent
Shipon et al.

(10) Patent No.: US 12,525,352 B2
(45) Date of Patent: Jan. 13, 2026

(54) SELECTIVE DATA GENERATION, TRANSMISSION AND PROCESSING

(71) Applicant: Heartpass Technologies Inc., Philadelphia, PA (US)

(72) Inventors: David Matthew Shipon, Philadelphia, PA (US); Jonathan Blum, Flourtown, PA (US); Marc Benjamin Shipon, Blue Bell, PA (US)

(73) Assignee: Heartpass Technologies Inc., Philadelphia, PA (US)

( * ) Notice: Subject to any disclaimer, the term of this patent is extended or adjusted under 35 U.S.C. 154(b) by 16 days.

(21) Appl. No.: 18/663,949

(22) Filed: May 14, 2024

(65) Prior Publication Data
US 2024/0387037 A1    Nov. 21, 2024

Related U.S. Application Data

(60) Provisional application No. 63/466,398, filed on May 15, 2023.

(51) Int. Cl.
*G16H 40/67* (2018.01)
*G16H 15/00* (2018.01)
*G16H 50/30* (2018.01)

(52) U.S. Cl.
CPC ............ *G16H 40/67* (2018.01); *G16H 15/00* (2018.01); *G16H 50/30* (2018.01)

(58) Field of Classification Search
CPC ......... G16H 40/67; G16H 15/00; G16H 50/30
USPC ....................................................... 705/2–3
See application file for complete search history.

(56) References Cited

U.S. PATENT DOCUMENTS

| | | | |
|---|---|---|---|
| 11,901,083 B1* | 2/2024 | Jain | G16B 20/00 |
| 2019/0046037 A1* | 2/2019 | Ramesh | G16H 50/20 |
| 2019/0209022 A1* | 7/2019 | Sobol | A61B 5/681 |

OTHER PUBLICATIONS

Souri et al., A new machine learning-based healthcare monitoring model for student's condition diagnosis in Internet of Things environment. Soft Comput 24, 17111-17121 (May 16, 2020). https://doi.org/10.1007/s00500-020-05003-6 (Year: 2020).*

Wu et al., Internet of things-enabled real-time health monitoring system using deep learning. Neural Comput & Applic 35, 14565-14576 (Sep. 15, 2021). https://doi.org/10.1007/s00521-021-06440-6 (Year: 2021).*

* cited by examiner

Primary Examiner — Joy Chng
(74) Attorney, Agent, or Firm — Fish & Richardson P.C.

(57) ABSTRACT

This disclosure relates to selective data generation, transmission and processing in customized healthcare services. In some aspects, a method includes determining one or more conditions for collecting a user's health data to assess the user's health status; determining that the one or more conditions are satisfies based on a first set of data from a first set of devices; in response to determining that the one or more conditions are satisfied, activating a second set of devices configured to monitor and collect the user's health data; receiving a second set of data from the second set of devices; assessing the user's health status using a machine learning model based on the first set of data and the second set of data; and generating and outputting for display a report including assessment results of the user's health status.

20 Claims, 4 Drawing Sheets

300A

302 — Heart Disease Risk:  MODERATE

304 — Your % risk of Heart Disease in the next 10 years: 5-10%
306 — Age: 56
308 — Blood Pressure: (Moderate Risk: Elevated Blood Pressure)
310 — Cholesterol: HDL (Unknown) and LDL (Unknown)

312 — Existing Conditions: None Mentioned.
314 — Symptoms: None mentioned.

Fortunately, you can reduce your risk! Your doctor can advise you on a personal health action plan to control your risk factors and reduce your heart and stroke risk.

320 — Lifestyle Health Risk:  MODERATE

322 — Ever smoked regularly: No.

324 — Weight: for your height, your weight is Overweight (Moderate Risk).

326 — Exercise: in a given week your activity level is Above Normal. Great!

You mentioned that you have some health goals and interests – that's great. Small changes to your lifestyle can make big improvements. Speak to our doctors about making sustainable changes in your daily habits to continue being healthy.

FIG. 3A

SELECTIVE DATA GENERATION, TRANSMISSION AND PROCESSING

CROSS-REFERENCE TO RELATED APPLICATIONS

This application claims the benefit of U.S. Provisional Application No. 63/466,398 filed on May 15, 2023, which is herein incorporated by reference in its entirety.

TECHNICAL FIELD

This specification generally relates to data generation, data transmission, and data processing.

BACKGROUND

With development of communication technologies, various devices can be used for health data collection. Such devices can include smartphones and tablets, wearable devices, remote monitoring devices, BLUETOOTH enabled devices, and other devices. The devices can constantly collect users' vital signs, physical activities, sleep patterns, medication adherence, symptoms, and other health data.

Continuous data collection may lead to higher energy consumption of the devices which may be battery-powered. Furthermore, by constantly monitoring and collecting users' health data, these devices can generate a large amount of data that may include redundant information. The large amount data can consume a significant volume of storage spaces that may be distributed at various locations. The large amount of data can also consume a substantial amount of bandwidth. Furthermore, because the health data includes user privacy, the large amount of data constantly collected at various devices and tools can increase the threat of data privacy breaches.

SUMMARY

This specification is generally directed to technologies for selectively collecting users' health data during health-condition specific circumstances, e.g., when the users are most vulnerable to certain health-conditions. Health data collected during such circumstances can inform the evaluation of the health-conditions. The monitoring sensors and devices can be activated during the periods of time corresponding to the health-condition-specific circumstances and deactivated during other times.

In general, one innovative aspect of the subject matter described in this specification can be embodied in methods that include the actions of determining one or more conditions for collecting a user's health data to assess the user's health status; determining that the one or more conditions are satisfies based on a first set of data from a first set of devices; in response to determining that the one or more conditions are satisfied, activating a second set of devices configured to monitor and collect the user's health data; receiving a second set of data from the second set of devices; assessing the user's health status using a machine learning model based on the first set of data and the second set of data; and generating and outputting for display a report including assessment results of the user's health status.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the method can include determining that one or more data included in the second set of data satisfy a threshold; and generating an alert indicating that the user is in a risky situation, the alert comprising guidance on activities the user is engaged in.

In some implementations, the one or more conditions for collecting the user' health data are based on the user's lifestyle and fitness level, and the one or more conditions for collecting the user's health data are based on a type of the health status to be assessed.

In some implementations, the first set of devices can include mobile devices, cameras, wearable devices, exercise equipment, Internet of things (IoT) devices. In some implementations, the second set of devices can include patches, straps, and wearable devices, and the second set of devices can include clinical grade devices of a medical kit.

In some implementations, the method can further include configuring exercise equipment engaged in by the user based on the assessment results. In some implementations, assessing the user's health status using the first set of data and the second set of data can include assessing the user's health status using a machine learning model using the first set of data and the second set of data as input to the machine learning model.

Particular implementations of the subject matter described in this disclosure can be implemented so as to realize one or more of the following advantages. The health data can be selectively collected during health-condition-specific circumstances that will inform the evaluation of health-condition. For example, users' real time health data can be wirelessly tracked during different times, e.g., when they are vulnerable to certain health-conditions, such as when they are engaged in exercising activities. The monitoring sensors and devices can be activated during the periods of time corresponding to the health-condition-specific circumstances and deactivated during other times. The technology described herein can collect less private health data, save storage resources, and save battery energy of the monitoring sensors and devices.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A-3B are examples of graphical user interfaces for assessment results of health status.

DETAILED DESCRIPTION

The technology described herein can collect the health data based on health-condition-specific logic by identifying circumstances for collecting health data that will inform the evaluation of health-condition. The circumstances for a certain health-condition can be circumstances where a user's body is generating signals particularly useful for that health-condition. During certain periods of time corresponding to the health-condition-specific circumstances, the monitoring sensors and devices can be switched on to collect the user's heath data. During other periods, the monitoring sensors and devices can be turned off. The technology described herein can collect a reduced amount of private health data, conserve storage resources, and save the battery energy of monitoring sensors and devices by collecting data selectively during circumstances specific to a particular health condition.

Figure 1:
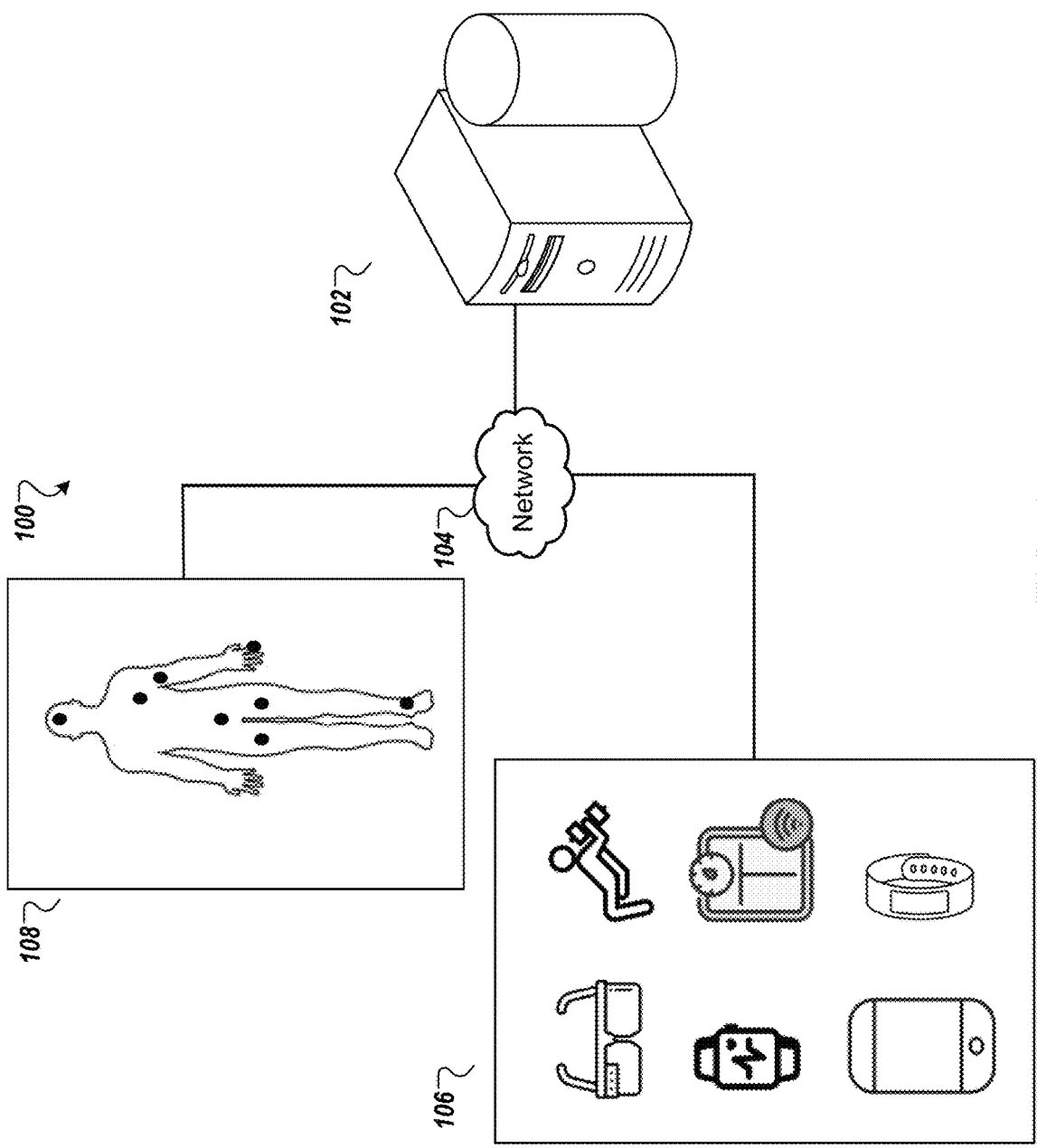
FIG. 1 is an example system for selective data generation, transmission and processing in customized healthcare services.

FIG. 1 is a block diagram of an example environment 100 for selective data generation, transmission and processing in customized healthcare services in accordance with technology described herein. The example environment 100 includes a computing system 102 including one or more computing devices, a network 104, a first set of devices 106, and a second set of devices 108.

The first set of devices 106 includes mobile devices, cameras, wearable devices such as such as smart watches, smart glasses, and wrist-worn bands, exercise equipment, Internet of things (IoT) devices such as smart scales, and the like. In some implementations, the first set of devices include any devices the user is using in daily life. Such devices can be used to monitor the user's daily activities. In some implementations, the first set of devices 106 can generate non-medical grade data.

Figure 2:
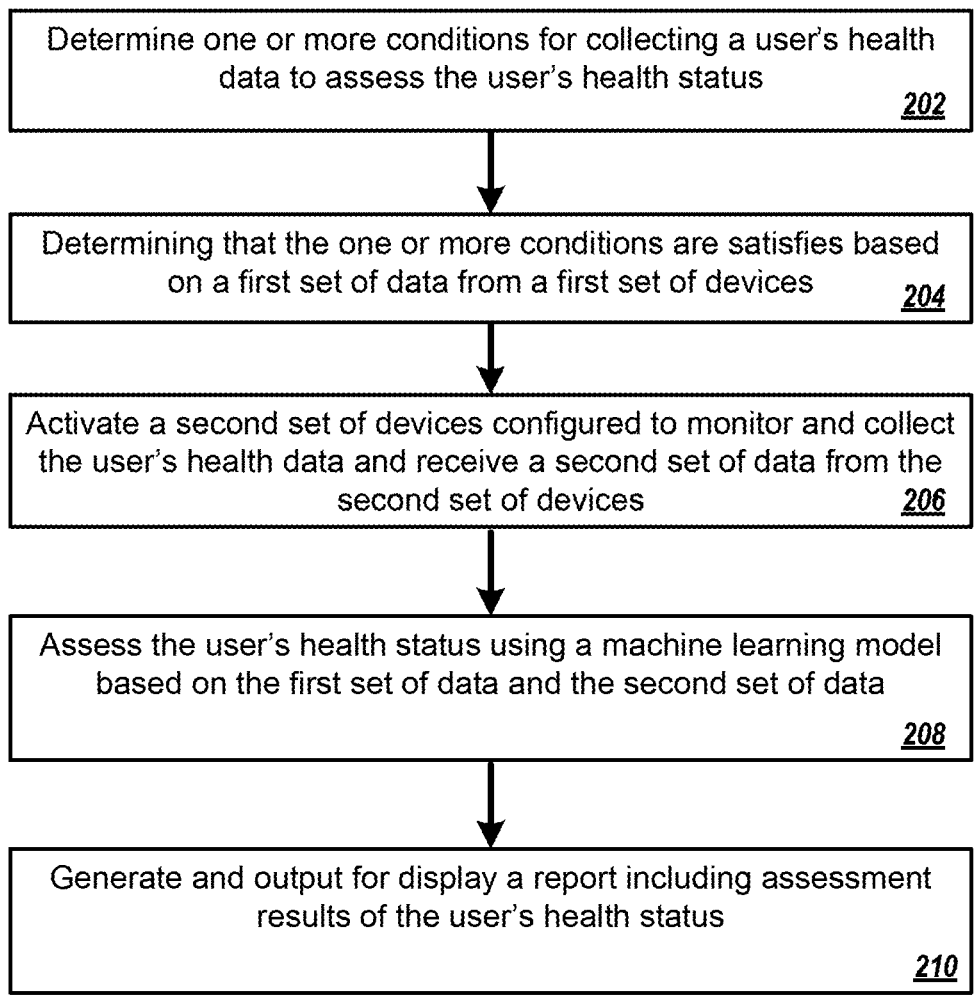
FIG. 2 is a flow diagram of an example process for selective data generation, transmission and processing in customized healthcare services.

The computing system 102 can receive a first set of data from the first set of devices 106 and determine the user's activities. The computing system 102 can determine whether the user is in situations or circumstances that call for health status assessment. Such situations/circumstances can include one or more times for certain health-condition assessment, such as before and after meals for diabetes assessment or early morning for heart status assessment (when people are at high risk for heart attacks). The situations or circumstances can also include one or more events that indicate the user is in a vulnerable time for certain health-conditions such as during sleep, or during exercise or stressful events. In some implementations, if the computing system 102 determines that the user is in such situations/circumstances, the computing system 102 can determine that one or more conditions for collecting the user's health data are satisfied. The one or more conditions can include the one or more times or one or more events for health-condition assessment. FIG. 2 and associated descriptions provide additional details of these implementations.

When the one or more conditions are satisfied, the computing system 102 can activate the second set of devices 108. The second set of devices 108 can be devices provided to the user to collect medical grade heath data. The second set of devices 108 includes patches, straps, and other wearable devices. For example, the second set of devices 108 can include medical grade devices for heart health that collect heart rate, blood pressure, heart rate variability, electrocardiogram (ECG) heart rhythm, V02 max, oxygen levels, and the like. Specifically, cardiovascular vital signs, such as multi-lead ECG and/or blood pressure and other vitals, can be collected by wireless connection of multiple patch electrodes and/or connected devices. Various combinations of devices or patch electrodes are placed wirelessly on the person's body, such as on chest. Depending on which devices are being used, the patches are strategically placed on other areas of the body to ensure there is a multi-lead ECG present. The placement of such devices includes a combination of "precordial leads" and "limb leads". For example, a clinical grade 12-lead ECG is collected, which represents the heart's electrical activity recorded from physically connected electrodes on the body surface. By wirelessly using the combination of various patch electrodes and/or connected devices, a clinical grade multi-lead electrocardiogram can be created. The set of second devices 108 can obtain accurate ECG and blood pressure readings during activities and active sporting events.

The second set of devices 108 includes mobile devices, remote monitoring devices, wearable devices, and sensors. For example, the second set of devices 108 can include various wearable sweat absorbent items and other standard wearables including bands, socks, shirts, sleeves. These wearable items contain insert locations on their interiors to enable disposable ECG leads to be snapped into place and unsnapped and replaced when needed, allowing the leads to touch the skin with a sticky lead bottom. The wearable items have a tightening mechanism like a belt to tighten the leads to the arm, chest or leg and hold the leads in place. In some implementations, up to 12 leads on these wearables are linked together to get real time lead readings.

In some implementations, the computing system 102 can receive the second set of data wirelessly and seamlessly from the second set of devices 108, without user interaction. The computing system 102 can receive the second set of data via the network 104, such as cellular, BLUETOOTH, WIFI, or another wireless connection mechanism.

The computing system 102 can run an artificial intelligence (AI)/machine learning (ML) model to assess the user's health status based on the first set of data and the second set of data. The computing system 102 can feed the first set of data and the second set of data into the trained AI/ML model as input and execute the AI/ML model. The output of the AV/ML model can include a health score that indicate the health status of the user for a certain type of health-condition. For example, based on both non-medical grade data in the first set of data and the medical grade data in the second set of date on the heart health, the computing system 102 can determine a health score for the heart condition. FIG. 2 and associated descriptions provide additional details of these implementations.

The computing system 102 can monitor the user's health data during the vulnerable time, and generate real time alerts when the collected health data satisfy a risk threshold. The alert can indicate that the user is in a risky situation. The alert can include guidance on activities the user is engaged in. For example, the computing system 102 can monitor and collect the user's heart health data when the user is exercising, and digitally guide the user through exercise programs. The alerts or warnings can be sent and displayed on the exercise equipment included in the first set of devices 106. In some implementations, the alerts or warnings can be sent to and displayed on a user device, such as a mobile phone or smart watch included in the first set of devices 106. For example, the alert can trigger a phone, a wearable band or other wearable devices, and/or other hardware to create an alert flashing light, sound, and/or vibration. Depending on the risk level of the user's health status, the computing system 102 can alert a central emergency center or a third-party individual or system (not shown) about a potential life-threatening situation, such as lethal heart rhythm. For instance, if the user develops high degree heart block or a ventricular tachycardia, the alerts of a high risk can be generated, and an emergency center can be contacted.

The technology described herein can provide customized healthcare services to people to empower health confidence. An accurate assessment of the users' health status can be performed in real time using artificial intelligence or machine learning models. The technology described herein can remove healthcare barriers and connect people to their own health data including medical grade health data. As a result, people can have access to their health data in real time during vulnerable circumstances, e.g., when they are engaged in different activities. The technology described herein can use both non-medical grade health data and medical grade health data to generate valuable medical outputs for end users and healthcare trams. Such an access to health data can help people to be more informed on their health status during particular times, especially during risky times, so that they can choose or adjust their actions accordingly. The technology described in this specification can stop potential life-threatening situations and alert the emergency team in a timely manner.

In some implementations, the computing system 102 can configure exercise equipment engaged in by the user based on the user's collected health data. The computing system can use machine learning and artificial intelligence technology to speed up or slow down the exercise equipment, add or remove weight, add or remove tension to the connected exercise equipment. The configurations of the exercise equipment are performed seamlessly without user interaction via the network 104, such as cellular, BLUETOOTH, WIFI, physical cord attachment or another connection mechanism.

The computing system 102 can include one or more computing devices, such as a server. The number of computing devices may be scaled (e.g., increased or decreased) automatically as per the computation resources needed. The various functional components of the computing system 102 may be installed on one or more computers as separate functional components or as different modules of a same functional component. For example, the various components of the computing system 102 can be implemented as computer programs installed on one or more computers in one or more locations that are coupled to each through a network. In cloud-based systems for example, these components can be implemented by individual computing nodes of a distributed computing system.

FIG. 2 is a flow diagram of an example process 200 for selective data generation, transmission and processing in customized healthcare services. In some implementations, at least a portion of the process 200 can be executed at the computing system 102.

At step 202, the computing system can determine one or more conditions for collecting a user's health data to assess the user's health status. Instead of constantly collecting the user's health data, the computing system can selectively collect the user's health data when one or more conditions are satisfied, so that the monitoring devices and sensors can be activated under certain circumstances and deactivated during other times. The one or more conditions can include one or more times or one or more events that indicate the circumstances for collecting the user's health data.

In some implementations, the one or more conditions for collecting the user's health data are based on a type of the health status to be assessed. For example, to assess cardiovascular status, the one or more conditions for collecting health data can include most vulnerable times for heart attacks, such as during exercise, stressful events, early morning (when people are at high risk for heart attacks), and during sleep. To assess diabetes status, the one or more conditions for collecting health data can include before and after meals and at bedtime. In some implementations, the type of health status can include pregnancy. At various times throughout the day and evening, the computing system can collect the health data and provide pregnancy risk assessment during and after pregnancy.

The one or more conditions for collecting the user's health data are based on the user's lifestyle and fitness level. The technologies described in this specification can be customized according to the user's lifestyle and fitness level to improve user experience and provide more accurate and personalized services. The computing system can receive a survey from the user that includes the user's medical history, activity and lifestyle status, genetics, lab diagnostics, and the like.

Based on the survey, the computing system can determine the user's lifestyle, such as the time of the user waking up, the time of having breakfast, the working schedule, exercising schedule, exercising activities, the time of going to bed, and other activities. For example, according to the user's lifestyle, the computing system can determine that 6 AM in the morning is a high-risk time for the user to have a heart attack. As a result, the one or more conditions for collecting the user's health data to assess heart health include 6 AM in the morning.

In some implementations, the one or more conditions can include parameters and thresholds that are customized to the user according to the user's fitness level. For example, the one or more conditions can include the events when one or more health data satisfy the threshold that is customized to the user. In some examples, the computing system can determine, based on the user's medical history and lifestyle, the user's fitness level. The computing system can customize the parameters and thresholds for each user according to the user's fitness level. The data collection can be triggered when one or more health data satisfy a customized threshold. For example, for an average user, the data collection is triggered when the user is walking at 2.5 miles per hour (mph). For a physically fit user, the data collection is triggered when the user is walking at 3.5 mph.

At step 204, the computing system can determine that the one or more conditions are satisfied based on a first set of data from a first set of devices. The first set of devices includes mobile devices, cameras, wearable devices (such as smart watches and wrist-worn fitness trackers), exercise equipment, Internet of things (IoT) devices, and the like. In some implementations, the survey received from the user can include the devices that the user is using in daily life. Such devices can be used as the first set of devices to monitor the user's daily activities and provide the first set of data for determining whether the user is in a vulnerable situation, e.g., whether the one or more conditions are satisfied.

Based on the first set of data from the first set of devices, the computing system can determine whether the one or more conditions are satisfied. For example, one of the conditions for collecting heart health data can be that the time is 6 AM in the morning. The computing system can determine that the condition is satisfied based on the time from a clock being 6 AM. In another example, one of the conditions for collecting heart health data can be that the user is exercising. The computing system can determine that the condition is satisfied based on data from certain devices indicating that the user is exercising. The data can include videos recorded by a camera, and/or data from wearable devices, and/or data from exercise equipment, and the like. For instance, a smart watch can generate a notification indicating that the user is running. The computing system can determine that the user is exercising based on the notification from the smart watch. Heart health is used as an example. The technology described in this specification can be applied to other types of health conditions or status.

At step 206, in response to determining that the one or more conditions are satisfied, the computing system can activate a second set of devices configured to monitor and collect the user's health data and receive a second set of data from the second set of devices. The second set of devices can be devices provided to the user to collect medical grade heath data. For example, based on the survey of the user's medical history and activity/lifestyle status, the computing system can determine the user's current health status and determine the health data needs to be collected based on the user's current health status. A set of devices customized to the user's current health status can be provided to the user to collect the health data needed to be collected. The second set of devices can include clinical grade devices provided to the user in a medical kit.

For example, the second set of devices for collecting heart health data includes patches, straps, and other wearable devices. The second set of devices for heart health can collect heart rate, blood pressure, heart rate variability, ECG heart rhythm, V02 max, oxygen levels, and the like. Specifically, cardiovascular vital signs, such as multi-lead ECG and/or blood pressure and other vitals, can be collected via wireless connection of multiple patch electrodes and/or connected devices. Various combinations of devices or patch electrodes are placed wirelessly on the person's body, such as on the chest. Depending on which devices are being used, the patches are strategically placed on other areas of the body to ensure there is a multi-lead ECG present. The placement of such devices includes a combination of "precordial leads" and "limb leads". For example, a clinical grade 12-lead electrocardiogram (ECG) is collected. The ECG represents the heart's electrical activity recorded from physically connected electrodes on the body surface. By wirelessly using the combination of various patches electrodes and/or connected devices, a clinical grade multi-lead electrocardiogram can be created. The set of second devices can obtain accurate ECG and blood pressure readings during various daily activities and active sporting events.

In some implementations, different health data are collected during different circumstances. For example, heart rate, blood pressure, heart rate, variability, VO2 max, heart rhythm, heart stress levels, metabolic, and sleep patterns data are collected in general for heart health monitoring. Additional data including ECG changes and arrhythmias, are collected during stressful times when a user is at the highest risk for myocardial infarction or cardiovascular events.

In some implementations, the computing system can receive the second set of data wirelessly and seamlessly from the second set of devices, without user interaction. The computing system can receive the second set of data via cellular, BLUETOOTH, WIFI, or another wireless connection mechanism.

In some implementations, in addition to determining when to start the data collection (e.g., when the one or more conditions are satisfied), the computing system can determine other data collection parameters, such as how long, how frequent, and in what granularity to collect the data. For example, the computing system can continuously monitor and collect the user's heart health data during the period when the user is exercising. The computing system can receive the heath data in real time and determine the data collection parameters based on the real time health data. For instance, if the user's heart rate reaches a threshold (e.g., 200 beats per minute) during exercise, the computing system can keep monitoring or collecting the user's heart health for a certain period of time (e.g., 30 minutes) after the user has finished exercising. The thresholds and other parameters can be customized to a particular user based on the user's fitness level and lifestyle.

The technology described herein can collect the health data based on health-condition specific logic by identifying circumstances for collecting health data that will inform the evaluation of health-condition. The circumstances for a certain health-condition can be circumstances where a user's body is generating signals particularly useful for that health-condition. The monitoring sensors and devices can be activated during certain periods of time corresponding to the health-condition specific circumstances, and deactivated during other times. By selectively collecting the health data during circumstances when the one or more conditions for data collection are satisfied, the technology described herein can collect less private health data, save storage resources, and save battery energy of the monitoring sensors and devices.

At step 208, the computing system can assess the user's health status using a machine learning model based on the first set of data and the second set of data. The computing system can run an artificial intelligence (AI)/machine learning (ML) model to assess the user's health status.

The AI/ML model can be trained by the computing system or another system using training data. The training data can include historical health data of a plurality of patients, such as the health data collected by various sensors and devices, medical records, lab diagnostics, and the like, and a corresponding health score for each patient on one or more health-conditions. The health score can be provided by physicians (such as cardiologists), technicians, or other health care providers. The AI/ML model can be trained using the training data including both the health data and the health scores for a plurality of patients. The trained AI/ML model can predict a health score for a new patient based on the new patient's health data.

In general, the AI/ML model is iteratively trained, where, during an iteration, one or more parameters (e.g., weights) of the AI/ML model are adjusted, and an output is generated based on the training data. For each iteration, a loss value is determined based on a loss function. The loss value represents a degree of accuracy of the output of the AI/ML model. In some examples, if the loss value does not meet an expected value (e.g., is not equal to zero), parameters of the ML model are adjusted in another iteration of training. In some instances, this process is repeated until the loss value meets the expected value.

The computing system can feed the first set of data and the second set of data into the trained AI/ML model as input and execute the AI/ML model. The output of the AI/ML model can include a health score that indicate the health status of the user for a certain type of health-condition. For example, based on the heart health data, the computing system can determine a health score for the heart condition.

In some implementations, to assess the user's health status, the computing system can determine whether one or more collected data satisfy a threshold or whether the one or more collected data are within or outside a normal range. Collected data that are outside a normal range can negatively affect the user's health score. For example, blood pressure higher than 210/220, ST change greater than 2 mm, ventricular heartbeat outside normal range (e.g., ventricular arrhythmias), and VO2 max below a threshold of a stated age are health data that would negatively affect the health score. In some examples, the computing system can use standard exercise guidelines to establish the thresholds for various health data, such as blood pressure, oxygen, heart rate, and heart rhythm thresholds.

Figure 3B:
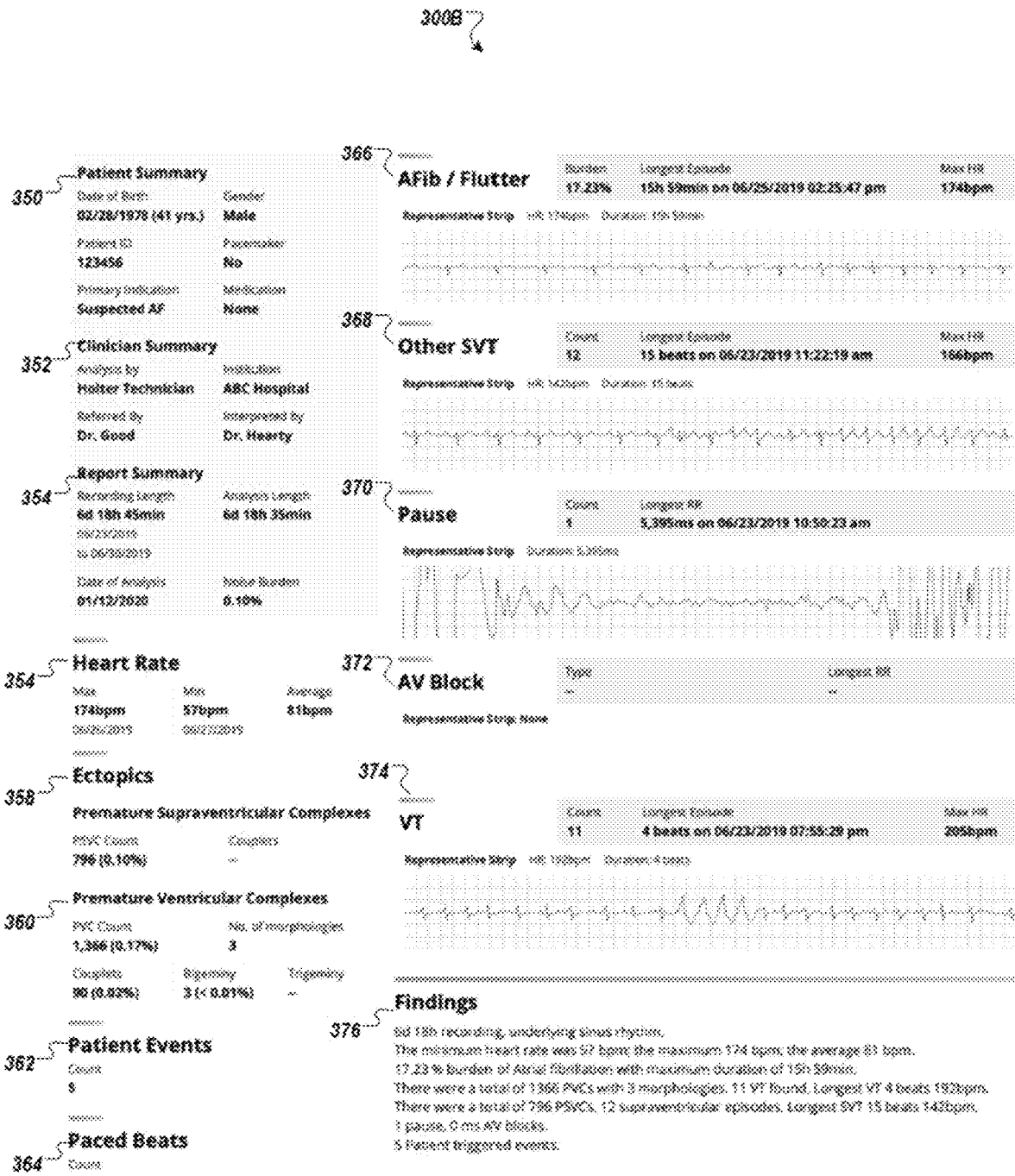

At step 210, the computing system can generate and output for display a report including assessment results of the user's health status. The assessment results can include the health score for a certain type of the health-condition. In some implementations, the assessment results include other information, such as the specific health data that deviate from normal ranges or indicate health concerns. The assessment results can also include the prediction results of one or more health risks, e.g., a risk score for heart disease in the next 10 year. The assessment results can be displayed to end users or health teams to provide informative health risk and wellness assessment data. FIGS. 3A-3B and associated descriptions provide additional details of these implementations.

The technology described herein can provide alerts and guidance during vulnerable times. In some implementations, the computing system can monitor the user's health data during the vulnerable time, and generate real time alerts when the user's health score satisfies a risk threshold. The alert can indicate that the user is in a risky situation. The alert can include guidance on activities the user is engaged in. For example, the computing system can monitor and collect the user's heart health data when the user is exercising, and digitally guide the user through exercise programs in an effort to maximize the user's cardiovascular performance. In some examples, the computing system can send an alert suggesting the user to slow down when the user's heart rate reaches 200 beats per minute. The alerts can include other information.

In some examples, the computing system can determine customized risk thresholds for each user according to the user's lifestyle and fitness level. In addition to the risk thresholds, the content of the alerts and guidance can also be customized to each user based on the user's lifestyle and fitness level.

In some implementations, the computing system can configure exercise equipment engaged in by the user based on the user's collected health data. The computing system can use machine learning and artificial intelligence technology to speed up or slow down the connected exercise equipment, add or remove weight, add or remove tension to the exercise equipment. For example, the computing system can provide individualized safety zones for the user that correspond to normal ranges of the health data. If the collected health data is outside the normal range or the health score satisfies the risk threshold, the computer system can trigger a danger zone alert and configure the exercise equipment to slow down or stop. In some implementations, the health score can be categorized into several risk levels, such as low, moderate, or high risk. The exercise equipment can be configured differently according to the different risk levels.

For example, if the blood pressure is 210/100 or the heart rate is in excess of 100percent of the maximal predicted heart rate for the user's age, the computing system may decide the user is in moderate risk and generate a risk warning signal and slow down the exercise equipment. If the user's health data remains in the danger zone for over a time threshold, e.g., over 3 minutes, the computing system can trigger a high-risk warning and stop the exercise equipment.

The configurations of the exercise equipment are performed seamlessly without user interaction via cellular, BLUETOOTH, WIFI, physical cord attachment or another connection mechanism. When monitoring the user's heart heath status, the computing system can use the standard cardiovascular hemodynamic parameters to change the intensity, duration, tension, weight, and/or speed of the exercise equipment including stationary bike, treadmill, or elliptical. For instance, the computing system can use heart rate, lactate acid levels, anaerobic threshold, and VO2 max to adjust the configurations of the exercise equipment.

In some implementations, the alerts or warnings can be sent and displayed on the exercise equipment. In some implementations, the alerts or warnings can be sent to and displayed on a user device, such as mobile phone, smart watch, and the like. For example, the alert can trigger a phone, a wearable band or other wearable devices, and/or other hardware to create an alert flashing light, sound, and/or vibration. Depending on the risk level of the user's health status, the computing system can alert a central emergency center or a third-party individual/system about a potential life-threatening situation, such as lethal heart rhythm. For instance, if the user develops high degree heart block or a ventricular tachycardia, the alerts of a high risk can be generated, and an emergency center can be contacted.

The technology described in this specification can track a person's real time health status wirelessly during the stress of exercising, such as walking, running, biking, playing sports, swimming, and other activities. The technology described in this specification can alert a user (e.g., trainer, athlete) or other people (e.g., medical team), during a game or activities when the user's real time health data shows high risk vital signs. For example, the ECG or cardiovascular parameters of high risk include ventricular tachycardia, supraventricular tachycardia with heart rates over 220 beats per minute, heart block, and ischemia, according to standard heart and cardiology guidelines. Through the artificial intelligence analysis, the technology described in this specification can accurately evaluate each user's health status during vulnerable times and stressful events. The technology described in this specification can stop potential life-threatening situations, such as lethal heart issues prior to sudden cardiac arrest, and alert the emergency team in tandem.

The order of steps in the process 200 described above is illustrative only, and the process 200 can be performed in different orders. In some implementations, the process 200 can include additional steps, fewer steps, or some of the steps can be divided into multiple steps.

FIGS. 3A-3B are examples of graphical user interfaces (GUIs) 300A, 300B for displaying assessment results of health status. FIG. 3A shows a GUI 300A for high level assessment results. The GUI 300A includes the assessment results of heart health status 302 (e.g., heart disease risk: moderate) and lifestyle health risk 320 (e.g., lifestyle health risk: moderate).

The assessment results for heart health status 302 include a risk score for heart disease in the next 10 years (e.g., 5%-10%) 304, age 306, blood pressure 308 (e.g., moderate risk, elevated blood pressure) 308, cholesterol 310, existing conditions 312, and symptoms 314.

The assessment results for lifestyle health risk 320 include smoking status 322, weight risk (e.g., whether the user is overweight) 324, exercise status (e.g., the activity level) 326. In some implementations, the assessment results can include guidance and suggestions on how to change the lifestyle to improve the health status.

FIG. 3B shows a GUI 300B for more detailed assessment results. The GUI 300B includes patient summary 350, optional clinician summary 352, and report summary 354. The GUI 300B includes the user's health data such as heart rate 356, ectopics 358, premature ventricular complexes 360, patient events 362, and paced beats 364. Furthermore, the GUI 300B includes diagrams of heart data, such as atrial fibrillation/flutter 366, other supraventricular tachycardia (SVT) 368, pause 370, atrioventricular (AV) block 372, ventricular tachycardia (VT) 374. The GUI 300B further includes findings 376 that summarize the collected health data, potential health-conditions and health risks.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    determining, by a computing system, one or more conditions of a user for performing a type of health status assessment, wherein the determination triggers collection of a user's health data by a first set of devices connected to the computing system, wherein the one or more conditions comprises at least one time instance associated with performing the type of health status assessment, wherein the first set of devices are configured to monitor physical activity of the user;
    determining, by the computing system and based on a first set of data collected by the first set of devices, that the one or more conditions for performing the type of health status assessment are satisfied, wherein the first set of data is collected by the first set of devices during the at least one time instance;
    in response to determining that the one or more conditions are satisfied, activating a second set of devices configured to monitor and collect the user's health data for a predetermined time instance subsequent the at least one time instance, the second set of devices being different from the first set of devices and the second set of devices comprising a wearable device worn by the user;
    providing a second set of data captured during the predetermined time instance by the wearable device from the second set of devices to a machine learning model of the computing system that is trained to generate a model output representing an assessment of the user's health status for the type of the health status assessment;
    generating, by the machine learning model, the model output based on the first set of data and the second set of data; and
    outputting, for display on a device associated with the user, assessment results of the user's health status from the model output.

2. The computer-implemented method of claim 1, further comprising:
    determining that one or more data included in the second set of data satisfy a threshold; and
    generating and outputting for display on the device associated with the user, an alert indicating an adjustment in physical activity of the user.

3. The computer-implemented method of claim 1, wherein:
    the one or more conditions for collecting the user' health data are based on at least one of (i) data representing the user's lifestyle and (ii) data representing the user's fitness level.

4. The computer-implemented method of claim 1, wherein the first set of devices comprises mobile devices, cameras, first wearable devices, exercise equipment, Internet of things (IoT) devices.

5. The computer-implemented method of claim 1, wherein:
the second set of devices comprises patches, straps, and second wearable devices, and
the second set of devices comprises clinical grade devices of a medical kit.

6. The computer-implemented method of claim 1, further comprising:
adjusting one or more configurable settings of exercise equipment engaged in by the user based on the assessment results.

7. The computer-implemented method of claim 1, wherein the second set of devices are configured to generate the second set of data and wherein the second set of data comprises at least one of (i) electrocardiogram data and (ii) blood pressure data, of the user.

8. The computer-implemented method of claim 1, further comprising:
generating, for display on the device, one or more graphical user interface elements indicating an adjustment in physical activity for the user based on the model output.

9. The computer-implemented method of claim 1, wherein the type of health status assessment comprises a heart health status and wherein the model output generated by the machine learning model further comprises at least one of (i) a score representing a likelihood of a heart condition and (ii) one or more heart metrics, for the user.

10. The computer-implemented method of claim 1, wherein the assessment of the model output comprises a score representing a likelihood of a physical condition associated with the type of health status assessment.

11. A non-transitory computer-readable medium encoded with instructions that, when executed by one or more computers, cause the one or more computers to perform operations comprising:
determining, by a computing system, one or more conditions of a user for performing a type of health status assessment, wherein the determination triggers collection of a user's health data by a first set of devices connected to the computing system, wherein the one or more conditions comprises at least one time instance associated with performing the type of health status assessment, wherein the first set of devices are configured to monitor physical activity of the user;
determining, by the computing system and based on a first set of data collected by the first set of devices, that the one or more conditions for performing the type of health status assessment are satisfied, wherein the first set of data is collected by the first set of devices during the at least one time instance;
in response to determining that the one or more conditions are satisfied, activating a second set of devices configured to monitor and collect the user's health data for a predetermined time instance subsequent the at least one time instance, the second set of devices being different from the first set of devices and the second set of devices comprising a wearable device worn by the user;
providing a second set of data captured during the predetermined time instance by the wearable device from the second set of devices to a machine learning model of the computing system that is trained to generate a model output representing an assessment of the user's health status for the type of the health status assessment;
generating, by the machine learning model, the model output based on the first set of data and the second set of data; and
outputting, for display on a device associated with the user, assessment results of the user's health status from the model output.

12. The non-transitory computer-readable medium of claim 11, wherein the operations further comprise:
determining that one or more data included in the second set of data satisfy a threshold; and
generating and outputting for display on the device associated with the user, an alert indicating an adjustment in physical activity of the user.

13. The non-transitory computer-readable medium of claim 11, wherein:
the one or more conditions for collecting the user' health data are based on at least one of (i) data representing the user's lifestyle and (ii) data representing the user's fitness level.

14. The non-transitory computer-readable medium of claim 11, wherein the first set of devices comprises mobile devices, cameras, first wearable devices, exercise equipment, Internet of things (IoT) devices.

15. The non-transitory computer-readable medium of claim 11, wherein:
the second set of devices comprises patches, straps, and second wearable devices, and
the second set of devices comprises clinical grade devices of a medical kit.

16. The non-transitory computer-readable medium of claim 11, wherein the operations further comprise:
adjusting one or more configurable settings of exercise equipment engaged in by the user based on the assessment results.

17. The non-transitory computer-readable medium of claim 11, wherein the second set of devices are configured to generate the second set of data and wherein the second set of data comprises at least one of (i) electrocardiogram data and (ii) blood pressure data, of the user.

18. A system comprising one or more computers and one or more storage devices on which are stored instructions that are operable, when executed by the one or more computers, to cause the one or more computers to perform operations comprising:
determining, by a computing system, one or more conditions of a user for performing a type of health status assessment, wherein the determination triggers collection of a user's health data by a first set of devices connected to the computing system, wherein the one or more conditions comprises at least one time instance associated with performing the type of health status assessment, wherein the first set of devices are configured to monitor physical activity of the user;
determining, by the computing system and based on a first set of data collected by the first set of devices, that the one or more conditions for performing the type of health status assessment are satisfied, wherein the first set of data is collected by the first set of devices during the at least one time instance;
in response to determining that the one or more conditions are satisfied, activating a second set of devices configured to monitor and collect the user's health data for a predetermined time instance subsequent the at least one time instance, the second set of devices being different from the first set of devices and the second set of devices comprising a wearable device worn by the user;

providing a second set of data captured during the predetermined time instance by the wearable device from the second set of devices to a machine learning model of the computing system that is trained to generate a model output representing an assessment of the user's health status for the type of the health status assessment;

generating, by the machine learning model, the model output based on the first set of data and the second set of data; and outputting, for display on a device associated with the user, assessment results of the user's health status from the model output.

19. The system of claim 18, wherein the operations further comprise:

determining that one or more data included in the second set of data satisfy a threshold; and generating and outputting for display on the device associated with the user, an alert indicating an adjustment in physical activity of the user.

20. The system of claim 18, wherein:

the one or more conditions for collecting the user' health data are based on at least one of (i) data representing the user's lifestyle and (ii) data representing the user's fitness level.

* * * * *